United States Patent [19]
Okui

[11] Patent Number: 5,988,550
[45] Date of Patent: Nov. 23, 1999

[54] FLY-FISHING REEL

[75] Inventor: Masatoshi Okui, Kyoto, Japan

[73] Assignee: Kiro World Co., Ltd, Kyoto, Japan

[21] Appl. No.: 09/181,146

[22] Filed: Oct. 27, 1998

[51] Int. Cl.$^6$ .................................................. A01K 87/06
[52] U.S. Cl. ...................... 242/316; 242/310; 242/317;
D22/141; 43/22
[58] Field of Search ................................. 242/310, 312,
242/316, 317; D22/140, 141, 138; 43/20,
22

[56] References Cited

U.S. PATENT DOCUMENTS

| | | | |
|---|---|---|---|
| D. 186,515 | 11/1959 | Clark | D22/141 |
| D. 231,225 | 4/1974 | Hull | D22/140 |
| D. 353,183 | 12/1994 | Kirby | D22/141 |
| 3,329,373 | 7/1967 | Wood, Jr. | D22/140 X |

*Primary Examiner*—Donald P. Walsh
*Assistant Examiner*—Emmanuel Marcelo
*Attorney, Agent, or Firm*—Morgan & Finnegan, L.L.P.

[57] ABSTRACT

A fly-fishing reel which has succeeded in overcoming such disadvantages of conventional ones that because a reel is attached to a rod through a rod connector having a constant thickness in the longitudinal direction, the center of gravity of the reel at which the reel weight is applied to the rod coincides with the center of the rod connector and is relatively away from a grip portion of the rod rearward, and hence the weight balance is not satisfactory in operation of swinging the rod to fly a fishing line. The inventive reel comprises a holder provided with a pair of flanges for guiding a rotating member, at least one line guide provided between the pair of flanges, a joint base provided between the pair of flanges and located below the line guide, and a rod connector having a joining flat portion which is inclined and joined to a recessed flat portion of the joint base. The center of gravity of the reel is shifted toward the side of a grip portion.

2 Claims, 4 Drawing Sheets

FLY-FISHING REEL

BACKGROUND OF THE INVENTION

1. Field of the Invention

The present invention relates to a fly-fishing reel, and more particularly to a novel improvement of the reel wherein a rod connector is mounted on a rod to provide a rod attachment surface inclined relative to the rod surface, the attachment surface is joined to a recessed flat portion on the reel side with good fittingness therebetween, and at least one line guide is provided in a predetermined angular position to avoid contact between the guide and a fishing line when the line is flied.

2. Description of the Related Art

Hitherto, fly-fishing reels have been generally constructed such that, though not shown, the reel is directly attached using fasteners to a rod connector in the form of a flat plate which is mounted on the root side of a rod.

In such a conventional fly-fishing reel, because the reel is located rearward of a grip portion of the rod and is directly attached to the rod through a rod connector having a constant thickness relative to the rod surface in the longitudinal direction, the center of gravity of the reel coincides with the center of the rod connector in the longitudinal direction and is not adjustable. Thus, a heavy weight of the reel is applied to the rod at a position relatively away from the grip portion rearward, and hence the weight balance has not been satisfactory in operation of swinging the rod to fly a fishing line.

Further, the conventional fly fishing reel has a plurality of, typically three, line guides bridging between a pair of flanges or a holder which is a main component of the reel. The three line guides are arranged with angular intervals of 90°, and one of them is located at an uppermost position relative to the rod. Therefore, when the fishing line is let to fly out from the reel in the flying operation, the line contacts the line guide at the uppermost position, imposing resistance on the line flying out.

SUMMARY OF THE INVENTION

The present invention has been made with the view of overcoming the problems set forth above, and its object is to provide a fly-fishing reel in which a rod connector is mounted on a rod to provide a rod attachment surface inclined relative to the rod surface, the attachment surface is joined to a recessed flat portion on the reel side with good fittingness therebetween, and at least one line guide is provided in a predetermined angular position to avoid contact between the guide and a fishing line when the line is flied.

A fly-fishing reel according to the present invention comprises a holder including a drum-shaped rotating member which is rotatably provided through a support and over which a fishing line is wound, a driving handle provided on the rotating member, a pair of flanges provided on the holder in spaced relation from each other for guiding the rotating member, at least one line guide provided to extend and connect between the pair of flanges, a joint base provided on the holder and arranged at a predetermined angular distance with respect to the line guide, a recessed flat portion formed in a lower surface of the joint base, and a rod connector having a joining flat portion joined to the recessed flat portion, the joining flat portion of the rod connector being inclined relative to a lower surface of the rod connector, a position of the center of gravity of the rotating member being offset from a position of the center of the rod connector in the longitudinal direction thereof. Then, preferably, the line guide is provided in number two and the predetermined angular distance is 120°.

DESCRIPTION OF THE PREFERRED EMBODIMENT

A preferred embodiment of a fly-fishing reel according to the present invention will be described below with reference to the drawings.

Figure 1:
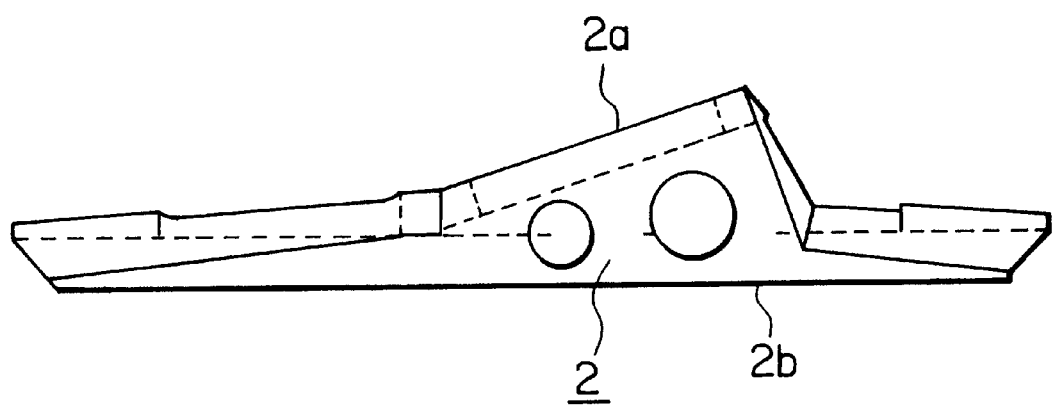
FIG. 1 is front view of one component of a fly-fishing reel according to the present invention.
Figure 2:
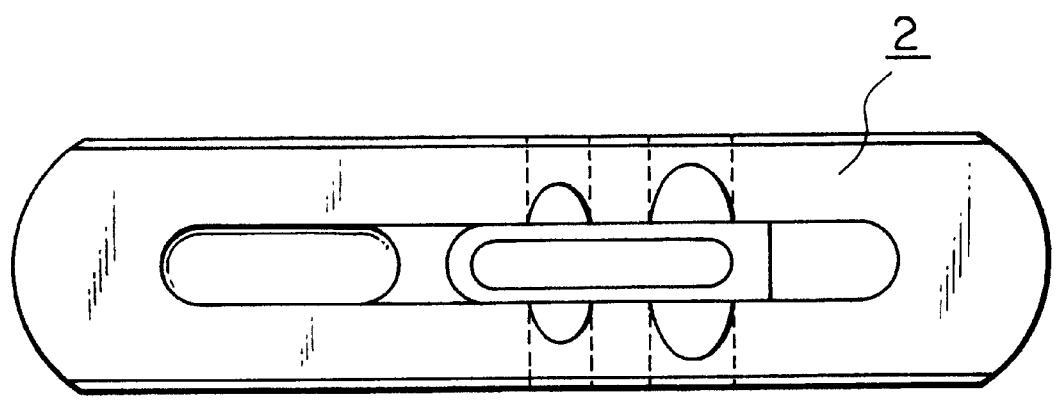
FIG. 2 is a bottom view of FIG. 1.
Figure 3:
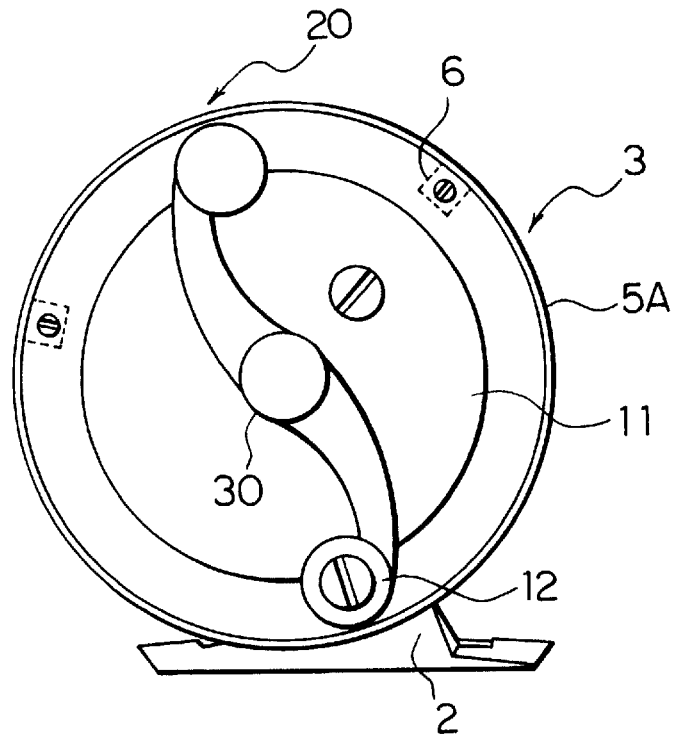
FIG. 3 is front view of the fly-fishing reel according to the present invention.
Figure 4:
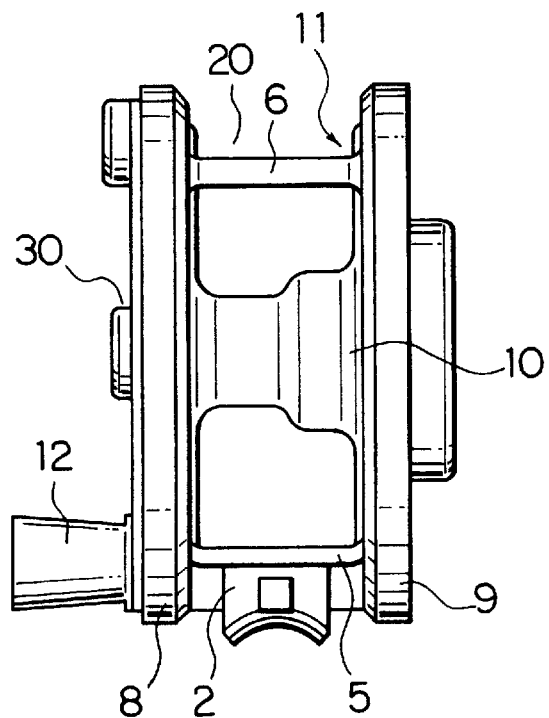
FIG. 4 is a side view of FIG. 3, looking from the right.
Figure 5:
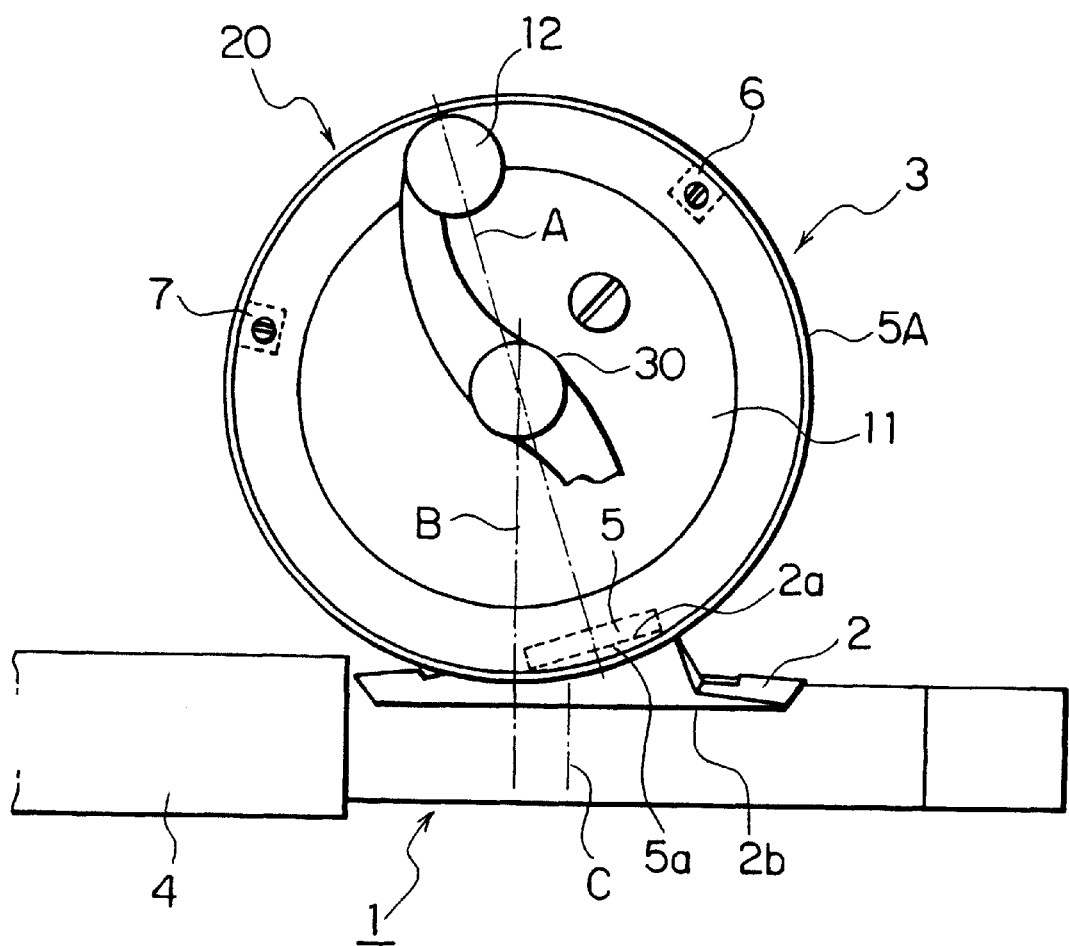
FIG. 5 is front view of the fly-fishing reel according to the present invention in a state where the reel is mounted on a rod.

In FIG. 5, reference number 1 denotes a rod and 2 denotes a rod connector mounted to a rear end of the rod 1 with a reel 3 attached to the rod connector 2. A grip portion 4 is formed on the rod 1 forward of the rod connector 2 so that the user can grip the grip portion 4 by hands for flying a fishing line.

The reel 3 comprises a holder 5A provided with a joint base 5 having a recessed flat portion 5a which is joined to a joining flat portion 2a of the rod connector 2, a pair of flanges 8, 9 spaced from each other and connected together by two line guides 6, 7 (although two line guides are used in this embodiment, the number of line guides may be one) which are extend to bridge the flanges (in the axial direction), the flanges and the line guides cooperatively constituting the holder 5A, a rotating member 11 rotatably guided by the flanges 8, 9 through a support 30, e.g., a bearing, and having a shaft portion 10 in the form of a drum as a whole, and a driving handle 12 provided on the rotating member 11 to project out of the holder 5A.

The line guides 6, 7 are disposed with a predetermined angular distance (which is 120° in this embodiment, but may be any other suitable angle than 120°) between them. The joint base 5 is disposed with a predetermined angular distance (which is 120° in this embodiment, but may be any other suitable angle than 120°) from each of the line guides 6, 7. The recessed flat portion 5a formed in the joint base 5 has a planar direction perpendicular to a diametrical direction A of the rotating member 11. Therefore, a position B of the center of gravity of the reel 3 (i.e., a position of the axis thereof) is offset from a position C of the center of the rod connector 2 in the longitudinal direction so that the position B of the center of gravity of the reel 3 is shifted toward the side of the grip portion 4.

Figure 6:
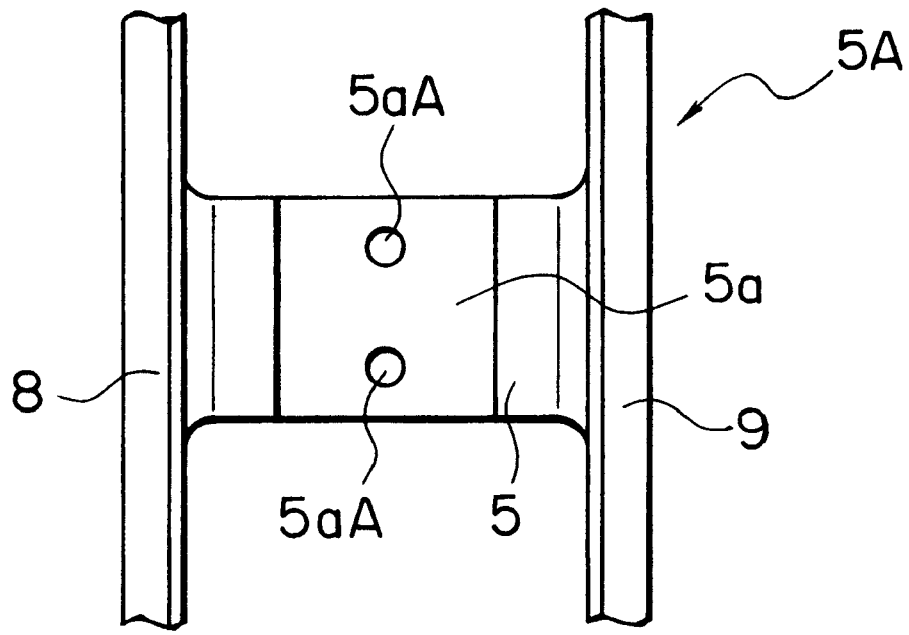
FIG. 6 is a plan view of principal part of a holder.
Figure 7:
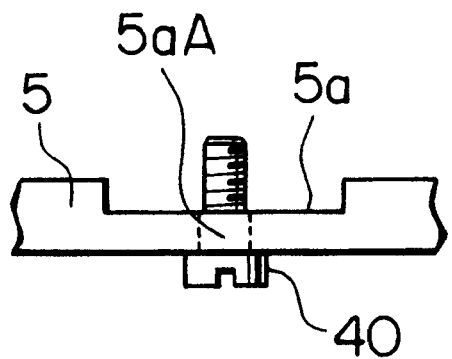
FIG. 7 is a partial front view of the principal part shown in FIG. 6.

The recessed flat portion 5a is formed in the joint base 5 as shown in FIGS. 6 and 7. The joining flat portion 2a formed on an upper surface of the rod connector 2 is fitted to the recessed flat portion 5a, and screws 40 are screwed into threaded holes 5aA formed in the flat portion 5a, whereby the rod connector 2 and holder 5A are joined together. Additionally, the joining flat portion 2a is inclined relative to a lower surface 2b of the rod connector 2.

With the above-described construction, the center of gravity of the reel 3 is somewhat shifted toward the fore side of the rod 1 in comparison with the conventional reels, and therefore the weight balance is improved in operation of swinging the rod 1 to fly a fishing line when the rod provided with the reel is practically used for fly fishing. Further, since only two line guides 6, 7 are disposed in an upper portion of the reel 3, a larger open space 20 than conventional is formed in the upper portion of the reel 3 between the line guides 6, 7. When a fishing line (not shown) wound over the shaft portion 10 of the rotating member 11 is let to fly out of the reel 3 in the flying operation, the line smoothly runs through the open space 20 without contacting the line guides 6, 7. Note that if it is not required to both the line guides 6, 7, one of them may be omitted. Also, with such a structure that the joint base 5 of the holder 5A is joined to the joining flat portion 2a of the rod connector 2 through the recessed flat portion 5a, even when the holder 5A and the rod connector 2 are different in material properties from each other, the holder 5A and the rod connector 2 can be retained in a stable connection state due to good fittingness between the recessed flat portion 5a and the joining flat portion 2a without causing a shift deviation. In other words, even if a rise in temperature causes the holder 5A and the rod connector 2 to expand in different conditions because of their specific material properties, the recessed flat portion 5a serves to maintain good fittingness with respect to the joining flat portion 2a. Additionally, as mentioned above, the number of line guides may be one or three.

The fly-fishing reel according to the present invention constructed as described above can provide the following advantages.

Since the recessed flat portion of the reel and the inclined joining flat portion of the rod connector are joined to each other so that the center of gravity of the reel is shifted toward the fore side of the rod in comparison with the conventional reels, the operation of swinging the rod to fly a fishing line is better balanced. Further, since the inclined joining flat portion of the rod connector is joined to the recessed flat portion of the reel, good fittingness is obtained between both the flat portions, and even when the holder and the rod connector are different in material properties, etc. from each other, satisfactory fittingness is ensured therebetween. As a result, the reel can be positively retained on the rod in its inclined state.

What is claimed is:

1. A fly-fishing reel comprising a holder including a drum-shaped rotating member which is rotatably provided through a support and over which a fishing line is wound, a driving handle provided on said rotating member, a pair of flanges provided on said holder in spaced relation from each other for guiding said rotating member, at least one line guide provided to extend and connect between said pair of flanges, a joint base provided on said holder and arranged at a predetermined angular distance with respect to said line guide, a recessed flat portion formed in a lower surface of said joint base and a rod connector having a joining flat portion joined to said recessed flat portion, said joining flat portion of said rod connector being inclined relative to a lower surface of said rod connector, a position of the center of gravity of said rotating member being offset from a position of the center of said rod connector in the longitudinal direction thereof.

2. The fly-fishing reel according to claim 1, wherein two of said line guides are provided, and said predetermined angular distance is substantially 120°.

* * * * *

UNITED STATES PATENT AND TRADEMARK OFFICE
CERTIFICATE OF CORRECTION

PATENT NO. : 5,988,550

DATED : November 23, 1999

INVENTOR(S) : Masatoshi OKUI

It is certified that error appears in the above-identified patent and that said Letters Patent is hereby corrected as shown below:

Column 2, line 62, change "5aA' " to --5aA--.

Column 2, line 63, after "and" and before "holder" insert --the--.

Signed and Sealed this

Third Day of April, 2001

*Attest:*

NICHOLAS P. GODICI

*Attesting Officer*   *Acting Director of the United States Patent and Trademark Office*